United States Patent
Kvist et al.

(10) Patent No.: US 11,653,159 B2
(45) Date of Patent: *May 16, 2023

(54) HEARING INSTRUMENT COMPRISING A BATTERY ANTENNA

(71) Applicant: GN Hearing A/S, Ballerup (DK)

(72) Inventors: Søren Kvist, Ballerup (DK); Alexandre da Luz Pinto, Ballerup (DK); Nikolaj Peter Brunvoll Kammersgaard, Ballerup (DK)

(73) Assignee: GN HEARING A/S, Ballerup (DK)

( * ) Notice: Subject to any disclaimer, the term of this patent is extended or adjusted under 35 U.S.C. 154(b) by 0 days.

This patent is subject to a terminal disclaimer.

(21) Appl. No.: 17/700,492

(22) Filed: Mar. 22, 2022

(65) Prior Publication Data

US 2022/0217481 A1 Jul. 7, 2022

Related U.S. Application Data

(63) Continuation of application No. 16/198,548, filed on Nov. 21, 2018, now Pat. No. 11,284,204.

(30) Foreign Application Priority Data

Dec. 29, 2017 (EP) .................................... 17211044

(51) Int. Cl.
*H04R 25/00* (2006.01)
*H01Q 5/378* (2015.01)
(Continued)

(52) U.S. Cl.
CPC ........... *H04R 25/554* (2013.01); *H01Q 1/273* (2013.01); *H01Q 5/328* (2015.01); *H01Q 5/335* (2015.01);
(Continued)

(58) Field of Classification Search
CPC .. H04R 25/70; H04R 2460/13; H04R 25/505; H04R 25/558; H04R 25/606;
(Continued)

(56) References Cited

U.S. PATENT DOCUMENTS 6,104,821 A    8/2000  Husung
11,284,204 B2* 3/2022  Kvist ................... H01Q 5/335
(Continued)

FOREIGN PATENT DOCUMENTS

CN    103715504    4/2014
CN    103826192    5/2014
WO  WO 2015127972   9/2015

OTHER PUBLICATIONS

Final Office Action for U.S. Appl. No. 16/198,548 dated Apr. 9, 2021.
(Continued)

*Primary Examiner* — Alexander Krzystan
*Assistant Examiner* — Julie X Dang
(74) *Attorney, Agent, or Firm* — Vista IP Law Group, LLP

(57) ABSTRACT

In accordance with the present disclosure a hearing instrument is provided. The hearing instrument comprises a wireless communication unit for wireless communication, a speaker interconnected with the wireless communication unit and being configured to provide an output audio signal, a battery configured to supply power to the hearing instrument, a filter circuit interconnecting the battery and a power management circuit of the hearing instrument, the wireless communication unit being interconnected with the battery, the battery being configured for emission and reception of an electromagnetic field having an RF wavelength. The filter circuit is configured to de-couple the battery and the power management circuit at frequencies above 3 MHz and con-
(Continued)

figured to connect the battery to the power management circuit at frequencies below 300 kHz.

27 Claims, 6 Drawing Sheets

(51) Int. Cl.
*H01Q 5/335* (2015.01)
*H01Q 1/27* (2006.01)
*H01Q 5/385* (2015.01)
*H01Q 5/328* (2015.01)
*H04R 1/10* (2006.01)
*H04M 1/60* (2006.01)

(52) U.S. Cl.
CPC ............. *H01Q 5/378* (2015.01); *H01Q 5/385* (2015.01); *H04R 1/1041* (2013.01); *H04R 25/505* (2013.01); *H04R 25/602* (2013.01); *H04M 1/6066* (2013.01); *H04R 25/552* (2013.01); *H04R 2225/33* (2013.01); *H04R 2225/51* (2013.01); *H04R 2225/61* (2013.01)

(58) Field of Classification Search
CPC ............ H04R 2225/41; H04R 2225/67; H04R 25/356; H04R 25/453; H04R 2225/43; H04R 2225/55; H04R 2225/63; H04R 25/552; H04R 25/554; H04R 25/602; H04R 2225/33; H04R 2225/51; H04R 2225/61

USPC .................................................. 381/315–319
See application file for complete search history.

(56) References Cited

U.S. PATENT DOCUMENTS

| 2006/0072774 | A1  | 4/2006 | Fluit |
| 2014/0071004 | A1* | 3/2014 | Jenwatanavet .......... H01Q 1/46 343/720 |
| 2017/0245065 | A1  | 8/2017 | Suhami et al. |

OTHER PUBLICATIONS

Non-Final Office Action for U.S. Appl. No. 16/198,548 dated Nov. 2, 2020.
Non-Final Office Action for U.S. Appl. No. 16/198,548 dated Feb. 6, 2020.
Notice of Alowance for U.S. Appl. No. 16/198,548 dated Nov. 17, 2021.
Extended European Search Repot and Search Opinion dated July, 2, 2018 for corresponding European Application No. 17211044.7.
Foreign OA for CN Patent Appln. No. 201811579962.1 dated Jun. 3, 2021.
English translation of Office Action dated Jun. 3, 2021 issued for Chinese Patent Application No. 201811579962.1.
Extended European Search Report for EP Patent Appln. No. 21192176.2 dated Sep. 10, 2021.

* cited by examiner

HEARING INSTRUMENT COMPRISING A BATTERY ANTENNA

RELATED APPLICATION DATA

This application is a continuation of U.S. patent application Ser. No. 16/198,548 filed on Nov. 21, 2018, pending, which claims priority to, and the benefit of, European Patent Application No. EP 17211044.7 filed on Dec. 29, 2017. The entire disclosure of the above application is expressly incorporated by reference herein.

TECHNICAL FIELD

The present disclosure relates to hearing instruments, such as hearing instruments for compensating a hearing loss of a user, such hearing instruments providing audio to a user, such as headsets, and particularly to hearing instruments having wireless communication capabilities and thus hearing instruments comprising antennas for communication, and particularly hearing instruments using a battery of the hearing instrument as at least a part of the antenna.

BACKGROUND

Hearing instruments of any kind have over the later years been increasingly able to communicate with the surroundings, including communicating with remote controls, spouse microphones, other hearing instruments and lately also directly with smart phones and other external electronic devices.

Hearing instruments are very small and delicate devices and to fulfil the above requirements, the hearing instruments need to comprise many electronic and metallic components contained in a housing small enough to fit in the ear canal of a human or behind the outer ear. The many electronic and metallic components in combination with the small size of the hearing instrument housing impose high design constraints on the radio frequency antennas to be used in hearing instruments with wireless communication capabilities.

Thus, antennas, typically radio frequency antennas, in the hearing instruments have to be designed to achieve connectivity with a wide range of devices to obtain good communication for all sizes and shapes of heads, ears and hair, in all environments and with as large frequency bandwidth as possible despite the space limitation and other design constraints imposed by the size of the hearing aid.

Particularly, the presence of a battery which accounts for a significant volume of such small hearing instruments have seen to effectively connect the antenna to a ground potential of the hearing instrument resulting in poor antenna performance.

SUMMARY

It is an object of the present disclosure to provide a hearing instrument with increased wireless communication capabilities.

In accordance with a first aspect of the present disclosure a hearing instrument is provided, the hearing instrument comprising a wireless communication unit for wireless communication interconnected with an antenna for emission and reception of an electromagnetic field having an RF wavelength. The hearing instrument comprises a speaker interconnected with the wireless communication unit and being configured to provide an output audio signal. A battery is configured to supply power to the hearing instrument and a filter circuit interconnects the battery and a power management circuit of the hearing instrument. The antenna may extend from a feed and at least a part of the antenna may be arranged adjacent the battery. In some embodiments, a distance between the at least part of the antenna and the battery is below $\frac{1}{40}$ of the RF wavelength.

In accordance with a second aspect of the present disclosure a method of operating a hearing instrument is provided, the hearing instrument comprising a wireless communication unit for wireless communication interconnected with an antenna for emission and reception of an electromagnetic field having an RF wavelength. The hearing instrument comprising a speaker interconnected with the wireless communication unit and being configured to provide an output audio signal. A battery is configured to supply power to the hearing instrument and a filter circuit interconnects the battery and a power management circuit of the hearing instrument, the method comprising feeding the antenna from a feed and coupling the antenna to the battery at the RF wavelength by arranging at least a part of the antenna adjacent the battery so that a distance between the at least part of the antenna and the battery is below $\frac{1}{40}$ of the wavelength. The battery may thus be configured as a parasitic antenna element. The method may further comprise the step of controlling a coupling between the battery and a ground potential via the filter circuit.

In accordance with a third aspect of the present disclosure a hearing instrument is provided, the hearing instrument comprising a wireless communication unit for wireless communication and a speaker interconnected with the wireless communication unit and being configured to provide an output audio signal. A battery is configured to supply power to the hearing instrument and a filter circuit is provided interconnecting the battery and a power management circuit of the hearing instrument. The wireless communication unit is interconnected with the battery, the battery being configured for emission and reception of an electromagnetic field having an RF wavelength.

In accordance with a fourth aspect of the present disclosure a method of operating a hearing instrument is provided, the hearing instrument comprising a wireless communication unit for wireless communication. The hearing instrument comprising a speaker interconnected with the wireless communication unit and being configured to provide an output audio signal. A battery is configured to supply power to the hearing instrument and a filter circuit interconnects the battery and a power management circuit of the hearing instrument. The method comprises feeding the battery from the wireless communication unit and using the battery for emission and reception of an electromagnetic field having an RF wavelength.

It is an advantage of using the battery as the antenna, or as a part of the antenna, of the hearing instrument in that the battery hereby may contribute to the emission and reception of an electromagnetic field having an RF wavelength. Hereby, any shielding or grounding of antenna elements within the hearing instrument caused by the presence of the battery may be reduced or eliminated. Using the battery as the antenna or as a part of the antenna, may increase the size of the antenna which can be accommodated in the hearing instrument. The use of the battery as the antenna or as part of the antenna may contribute to an improvement of antenna performance in terms of efficiency and/or bandwidth, such as due to a larger possible size of the antenna.

In some embodiments, the filter circuit is configured to de-couple the battery and the power management circuit at frequencies above 3 MHz, such as de-couple the battery and a ground potential.

In some embodiments, the filter circuit is configured to connect the battery to the power management circuit at frequencies below 300 kHz. Hereby, the battery is configured to supply power to the power management circuit at frequencies below 300 kHz, such as below 3 kHz, such as at DC currents.

In some embodiments, the filter circuit controls a coupling between the battery and a ground potential at RF frequencies, such as at frequencies above 3 MHz, such as at frequencies between 3 MHz and 6 GHz, such as between 3 MHz and 60 GHz, such as between 3 MHz and 300 GHz.

In some embodiments, the filter circuit is an oscillating filter circuit at RF frequencies, such as an oscillating LC filter circuit, and the battery is configured to oscillate in accordance with the oscillating filter circuit.

The battery may hereby be configured to supply power, such as to supply DC power, to the hearing instrument via the power management circuit, such as to the components of the hearing instrument, including the wireless communication unit, the speaker, etc., at low frequencies, such as at frequencies below 300 kHz, such as below 3 kHz, such as at DC currents, while the battery at RF frequencies may vibrate or oscillate with the electromagnetic field having an RF wavelength to be emitted and received through the wireless communication unit.

In some embodiments, the power management circuit is an electric circuit configured to receive supply power from the battery, such as DC supply power, and distribute the supply power to the components of the hearing instrument requiring power. The power management circuit may in any way known to a skilled person comprise voltage regulators, switch mode regulators, AC-DC converters and controllers, switching DC-DC converters, protections, etc.

The filter circuit, the power management circuit, one or more of the hearing instrument components, etc. may be provided at a printed circuit board in the hearing instrument.

The filter circuit may be configured to ensure that the battery is not connected to the ground potential, such as to the ground potential of the hearing instrument, at RF frequencies. The filter circuit may be configured to de-couple the battery from the ground potential. In some embodiments, the battery may resonate with the electromagnetic field having an RF wavelength to be emitted and received through the wireless communication unit.

In some embodiments, the filter circuit comprises tuning components, the tuning components being configured to determine an impedance of the filter circuit, such as an RF impedance of the filter circuit.

The tuning components may be configured to tune the impedance of the filter circuit to the battery with respect to the RF wavelength, such as the RF wavelength of the antenna.

In some embodiments, the tuning components comprises one or more inductors, one or more capacitors, transmission lines, such as a quarter wavelength transmission line, etc. or any combination thereof. The tuning components typically are combined to provide required impedance. In some embodiments, the tuning components have an RF impedance magnitude of at least 10 Ohm, such as of at least 50 Ohm, such as of at least 100 Ohm, such as of at least 500 Ohm. The tuning components may have an RF impedance magnitude of between 10 Ohm and 100 Ohm, such as of between 50 Ohm and 500 Ohm.

In some embodiments, the tuning components have an inductive reactance of between ½ nH and 50 nH. In some embodiments the tuning components has a capacitive reactance of between 0.1 pF and 100 pF.

In some embodiments, the battery is connected to ground through the tuning components. The ground may be any ground, such as any ground potential provided in the hearing instrument. Typically, the battery will be connected to the printed circuit board of the hearing instrument, and thus through the tuning components to the ground potential of the printed circuit board.

The filter circuit, and the tuning components of the filter circuit, may control the coupling between the battery and the ground via the filter circuit. The battery may thus not be coupled directly to the ground potential, rather the filter circuit controls the coupling between the battery and the ground.

The ground potential of the filter circuit may be the ground potential of the printed circuit board.

In some embodiments, the battery has a positive and a negative pole, and the hearing instrument comprises first and second battery terminals for connecting the battery, such as the battery poles, to the printed circuit board of the hearing instrument. The hearing instrument further comprises a coupling element, the coupling element interconnecting the battery with the filter circuit via battery terminals. The coupling element may thus comprise first and second battery contacts for connecting the positive and the negative pole of the battery to first and second battery terminals. The battery terminals are typically provided at the printed circuit board. The battery is connected to the filter circuit via the battery terminals.

The hearing instrument may comprise a number of components, including the microphone, the wireless communication unit, etc. The hearing instrument may further comprise a signal processor, the signal processor interconnecting the speaker with the wireless communication unit. The signal processor may be any processor, such as any hardware processor, and may be configured for audio processing, including filtering, such as noise filtering, amplification, etc. In some embodiments, the microphone is configured for reception of sound and conversion of the received sound into a corresponding first audio signal and the signal processor is configured for processing the first audio signal into a second audio signal. The speaker is connected to the output of the signal processor for converting the second audio signal into an output sound signal to be provided to a user. In some embodiments, the microphone is configured for reception of sound and conversion of the received sound into a corresponding first audio signal and the signal processor is configured for processing the first audio signal into a second audio signal compensating a hearing loss of a user of the hearing instrument. The speaker is connected to the output of the signal processor for converting the second audio signal into an output sound signal to be provided to a user.

The wireless communication unit is configured for wireless communication, including wireless data communication. The wireless communication unit may comprise a transmitter, a receiver, a transmitter-receiver pair, such as a transceiver, a radio unit, etc. The wireless communications unit may be configured for communication using any protocol as known for a person skilled in the art, including Bluetooth, including Bluetooth Low Energy, Bluetooth Smart, etc., WLAN standards, manufacture specific protocols, such as tailored proximity antenna protocols, such as proprietary protocols, such as low-power wireless communication protocols, such as CSR mesh, etc.

In some embodiments according to the first and second aspects of the disclosure, the hearing instrument comprises an antenna, such as an elongated antenna element, such as a conductive material in an elongated shape. The antenna is interconnected with the wireless communication unit for wireless communication, and the antenna is configured for emission and reception of an electromagnetic field having an RF wavelength. In some embodiments, the antenna extends from a feed and at least a part of the antenna is arranged adjacent the battery. A distance between the at least part of the antenna and the battery may be below 1/40 of the wavelength, such as below 1/40 of the RF wavelength. The distance between the at least part of the antenna arranged adjacent the battery may be below 1/20 of the RF wavelength, such as below 1/40 of the RF wavelength, such as below 1/50 of the RF wavelength, etc. The distance between the at least part of the antenna arranged adjacent the battery may be configured to ensure coupling of an electromagnetic field to the battery. In some embodiments, the electromagnetic field is not grounded via the battery. In some embodiments, the electromagnetic field is coupled to the battery which is connected to ground via the filter circuit.

In some embodiments, the antenna has a free end, the antenna forms at least partly a loop around the battery, the antenna forms a loop around the antenna, and/or the antenna is a dipole antenna.

In some embodiments, the antenna has a free end. The antenna may form at least partly a loop around the battery. The at least part of the antenna being arranged adjacent the battery may be a free end of the antenna.

In some embodiments, the antenna forms a loop around the battery. The at least part of the antenna being arranged adjacent the battery is a center part of the antenna.

In some embodiments, the tuning components are configured to optimize a coupling between the antenna and the battery, such as at the RF wavelength, or at the RF frequency. In some embodiments, the tuning components in the filter circuit are configured to control the coupling between the battery and the ground to optimize the coupling between the antenna and the battery, for example by selecting tuning component values to obtain a filter circuit resonance corresponding to the RF electromagnetic frequency, or RF electromagnetic wavelength, of the antenna, and thus of the wireless communication unit.

In some embodiments, the coupling between the antenna and the battery, the battery being connected to the filter circuit, enables the battery to act as a parasitic antenna element and enhance the antenna emission and reception. The battery may have an oscillating frequency determined by the filter circuit and the filter circuit tuning components. The battery oscillating frequency may correspond, such as substantially correspond, to the RF frequency of the antenna.

It is an advantage of the present disclosure that by having the battery connected to a filter circuit, and, for example having the battery operating as a parasitic antenna element, may increase the bandwidth of the antenna and thus of the electromagnetic field emitted and received by the hearing instrument. Additionally or alternatively, it is an advantage of the present disclosure that by having the battery connected to a filter circuit, and for example having the battery operating as a parasitic antenna element, may increase the efficiency of the antenna and thus of the electromagnetic field emitted and received by the hearing instrument.

In some embodiments, the antenna is a resonant antenna. The antenna may for example be a full wavelength loop antenna, the antenna may be a quarter wavelength antenna, the antenna may be a half wavelength antenna, etc.

The antenna may comprise an antenna tuning stub, e.g. to form an inverted F antenna, an IFA, the antenna may be interconnected to the wireless communication unit or radio via an antenna matching circuit, such as via a balun, etc. In some embodiments, the feed of the antenna is provided as a feed at the printed circuit board, and one or more transmission lines may interconnect the feed to the wireless communication unit.

The hearing instrument may comprise a further parasitic antenna element, particularly, the hearing instrument may further comprise a further parasitic antenna element corresponding to the second parasitic antenna element as discussed below.

In some embodiments according to the third and fourth aspect above, a hearing instrument is provided, wherein the wireless communication unit is interconnected with the battery, the battery being configured for emission and reception of an electromagnetic field having an RF wavelength. The battery is configured to be fed by the wireless communication unit and has a battery feed. In some embodiments, the feed may be provided at the coupling element, such as at the first or second battery terminal. Typically, the wireless communication unit is interconnected to the battery feed via one or more transmission lines. In some embodiments, a DC blocking element, such as a DC blocking element comprising a capacitor, is provided at the transmission line, such as in series with the transmission line.

In some embodiments, the tuning components are configured to optimize a coupling between the wireless communication unit and the battery, such as at the RF wavelength, or at the RF frequency. In some embodiments, the tuning components in the filter circuit are configured to control the coupling between the battery and the ground to optimize the coupling between the wireless communication unit and the battery, for example by selecting tuning component values to obtain a filter circuit resonance corresponding to the RF electromagnetic frequency, or RF electromagnetic wavelength, of the wireless communication unit.

In some embodiments, the wireless communication unit is interconnected with the battery, the battery being configured for emission and reception of an electromagnetic field having an RF wavelength, in that the battery is further connected to the filter circuit controlling the coupling between the battery and wireless communication unit, at the RF wavelength.

In some embodiments, the hearing instrument further comprises one or more parasitic antenna elements. The one or more parasitic antenna elements may have a free end, and at least one of the one or more parasitic antenna elements may form at least partly a loop around the battery. Alternatively, or additionally, at least one of the one or more parasitic antenna elements forms a loop around the battery.

At least a part of the one or more parasitic antenna elements are typically being arranged adjacent the battery. In some embodiments, the at least part of the one or more parasitic antenna elements being arranged adjacent the battery, is arranged with a distance between the at least part of the parasitic antenna element and the battery being below 1/40 of the wavelength, such as below 1/40 of the RF wavelength. The distance between the at least part of the parasitic antenna element arranged adjacent the battery may be below 1/20 of the RF wavelength, such as below 1/40 of the RF wavelength, such as below 1/50 of the RF wavelength, etc. The distance between the at least part of the parasitic antenna element arranged adjacent the battery may be configured to ensure coupling of an electromagnetic field from the battery to the at least part of the parasitic antenna element.

In some embodiments, the at least part of the one or more parasitic antenna elements being arranged adjacent the battery is a free end of the parasitic antenna element.

In some embodiments, the at least part of the one or more parasitic antenna elements being arranged adjacent the battery is a center part of the one or more parasitic antenna elements.

In some embodiments, at least one of the one or more parasitic antenna elements is a floating parasitic antenna element, that is a parasitic antenna element which is not connected to a ground, such as not connected to a ground of the hearing instrument, such as not connected to a ground of the printed circuit board.

In some embodiments, the floating parasitic antenna element has a length of half the RF wavelength.

In some embodiments at least one of the one or more parasitic antenna elements is connected to a ground potential. The parasitic antenna elements being connected to the ground potential may be connected to the ground potential via a parasitic antenna element tuning circuit.

In some embodiment, the parasitic antenna element being connected to the ground potential has a length of a quarter of the RF wavelength. The at least one parasitic antenna element being connected to the ground potential may further comprise a tuning stub.

The tuning components of the filter circuit are, in some embodiments, configured to optimize a coupling between the battery and the one or more parasitic antenna elements at the RF frequency.

In some embodiments, the coupling between the filter circuit and the battery, such as the battery antenna, enables the battery to act as an antenna, such as to act as an antenna element, and enable antenna emission and reception via the battery. The battery may have an oscillating frequency determined by the filter circuit and the filter circuit tuning components. The battery oscillating frequency may correspond, such as substantially correspond, to the RF frequency of the wireless communication unit.

It should be emphasized that the hearing instrument may be any hearing instrument, including hearing instruments compensating a hearing loss of a user, hearing instruments providing audio to a user, including headsets, earphones, etc. The hearing instrument may be any hearing instruments having wireless communication capabilities.

The hearing instrument may be a hearing instrument compensating a hearing loss of a user, and the hearing instrument may be any type of hearing instrument, including in-the-ear hearing instruments, completely-in-the-canal hearing instruments, behind-the-ear hearing instruments, receiver-in-the ear hearing instruments, and any combination of such hearing instruments or hearing aids compensating a hearing loss of a user. The hearing instrument may furthermore be a headset, such as a headset or earphones having on-the-ear earphones, particularly such as a headset or earphone being configured to be arranged in or at the ear of a user.

It is an advantage of the present disclosure that by having the battery connected to a filter circuit, and, for example having the battery operating as a an antenna, such as operate as a battery antenna, may reduce the size of the hearing instruments, as no extra components are needed for providing an antenna in the hearing instrument. It is an advantage of the present disclosure that by having the battery connected to a filter circuit, and for example having a parasitic antenna element coupling to the battery, the efficiency and/or the bandwidth of the antenna may increase and thus the efficiency and/or the bandwidth of the electromagnetic field emitted and received by the hearing instrument.

In the following the embodiments are described primarily with reference to a hearing instrument, such as a hearing aid. The hearing aid may be a binaural hearing aid. It is however envisaged that any embodiments or elements as described in connection with any one aspect may be used with any other aspects or embodiments, mutatis mutandis.

A hearing instrument includes: a wireless communication unit for wireless communication; a speaker coupled to the wireless communication unit and being configured to provide an output audio signal; a battery configured to supply power for the hearing instrument; a power management circuit; and a filter circuit coupled to the battery and the power management circuit; wherein the wireless communication unit is coupled with the battery, the battery being configured for electromagnetic field emission and electromagnetic field reception, wherein an electromagnetic field emitted or received by the battery has a wavelength.

Optionally, the filter circuit is configured to de-couple the battery and the power management circuit at frequencies above 3 MHz.

Optionally, the filter circuit is configured to connect the battery to the power management circuit at frequencies below 300 kHz.

Optionally, the battery is configured to supply power to the power management circuit at frequencies below 300 kHz.

Optionally, the filter circuit is configured to control a coupling between the battery and a ground potential at frequencies above 3 MHz.

Optionally, the hearing instrument further includes tuning component(s) configured to determine an impedance of the filter circuit.

Optionally, the hearing instrument further includes tuning component(s) configured to tune an impedance of the filter circuit with respect to the wavelength.

Optionally, the tuning component(s) comprises an inductor, a capacitor, a transmission line, or any combination thereof.

Optionally, the transmission line comprises a quarter wavelength transmission line.

Optionally, the tuning component(s) has an inductive reactance that is between ½ nH and 50 nH.

Optionally, the tuning component(s) has a capacitive reactance that is between 0.1 pF and 100 pF.

Optionally, the tuning component(s) has an RF impedance magnitude that is at least 100 Ohm.

Optionally, the hearing instrument further includes a coupling element interconnecting the battery with the filter circuit via first and second battery terminals, the coupling element comprising first and second battery contacts configured to contact positive and negative poles of the battery to the first and second battery terminals, respectively.

Optionally, the battery is configured to be fed by the wireless communication unit, and has a feeding point at a coupling element interconnecting the battery with the filter circuit.

Optionally, the hearing instrument further includes one or more parasitic antenna elements, wherein at least one of the one or more parasitic antenna elements has a free end.

Optionally, a distance between at least a part of the one or more parasitic antenna elements and the battery is below 1/40 of the wavelength.

Optionally, the at least a part of the one or more parasitic antenna elements is a free end of the one or more parasitic antenna elements.

Optionally, the at least a part of the one or more parasitic antenna elements is a center part of the one or more parasitic antenna elements.

Optionally, at least one of the one or more parasitic antenna elements is a floating parasitic antenna element.

Optionally, the hearing instrument further includes tuning component(s) configured to improve a coupling between the battery and the one or more parasitic antenna elements at a certain frequency.

Optionally, the hearing instrument further includes a parasitic antenna element, wherein at least a part of the parasitic antenna element forms at least a part of a loop around the battery.

A method of operating a hearing instrument, the hearing instrument comprising a wireless communication unit for wireless communication, a speaker coupled to the wireless communication unit and configured to provide an output audio signal, a battery configured to supply power for the hearing instrument, a power management circuit, and a filter circuit coupled to the battery and the power management circuit, the method includes feeding the battery from the wireless communication unit, and using the battery for electromagnetic field emission and electromagnetic field reception.

BRIEF DESCRIPTION OF THE DRAWINGS

The above and other features and advantages will become readily apparent to those skilled in the art by the following detailed description of exemplary embodiments thereof with reference to the attached drawings, in which.

DETAILED DESCRIPTION

Figure 1:
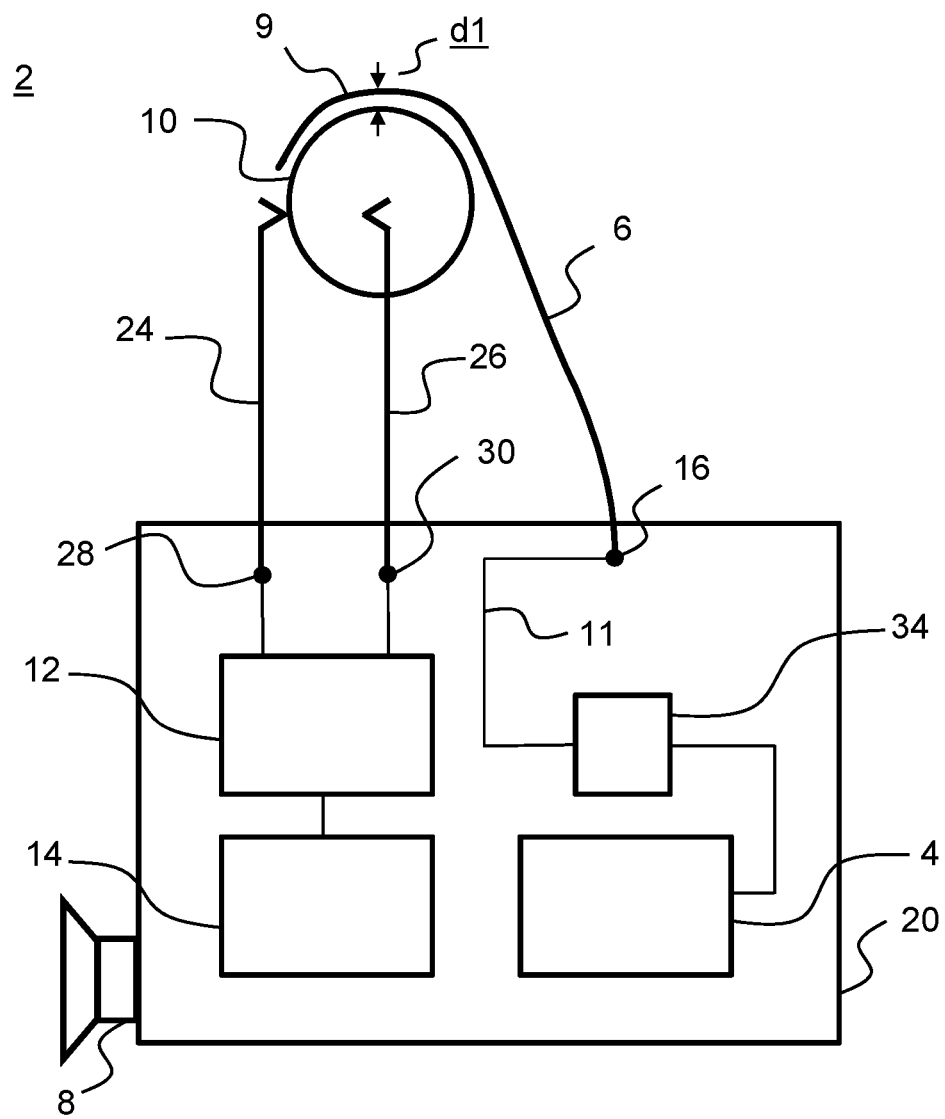
FIG. 1 shows schematically a hearing instrument according to the present disclosure in which at least a part of an antenna is provided adjacent the battery.

Various exemplary embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

The claimed invention may be embodied in different forms and should not be construed as limited to the embodiments set forth herein.

FIG. 1 shows schematically a hearing instrument 2 according to a first aspect of the present disclosure. The hearing instrument 2 comprises a wireless communication unit 4 for wireless communication interconnected with an antenna 6 for emission and reception of an electromagnetic field having an RF wavelength. The hearing instrument 2 comprises a speaker 8 interconnected with the wireless communication unit 4 and being configured to provide an output audio signal. A battery 10 is configured to supply power to the hearing instrument 2. A filter circuit 12 interconnects the battery and a power management circuit 14 of the hearing instrument 2. The antenna 6 may extend from a feed 16 and at least a part 9 of the antenna may be arranged adjacent the battery 10. A distance d1 between the at least part of the antenna 9 and the battery 10 is below ¼₀ of the wavelength. The antenna feed 16 is interconnected to the wireless communication unit 4 via a transmission line 11. The wireless communication unit 4, the filter circuit 12 and the power management circuit 14 are typically provided at a printed circuit board 20. Most often, the components and circuits are provided on a same printed circuit board 20, however, different circuits or units may also be provided on different, but interconnected printed circuit boards.

The battery 10 has a positive and a negative pole, and the hearing instrument 2 comprises a first battery terminal 28 and a second battery terminal 30 for connecting the battery 10, such as the battery poles, to the printed circuit board 20 of the hearing instrument 2. The hearing instrument 2 further comprises a coupling element 24, 26, the coupling element 24, 26 interconnecting the battery 10 with the filter circuit 12 via the battery terminals 28, 30. The coupling element 24, 26 may thus comprise a first battery contact 24 and a second battery contact 26 for connecting the positive and the negative pole of the battery to first and second battery terminals 28, 30. The battery terminals 28, 30 are typically provided at the printed circuit board 20. The battery 10 is connected to the filter circuit 12 via the battery terminals 28, 30.

Typically, the antenna 6 is interconnected with the wireless communication unit 4 via a transmission line 11 and/or an antenna matching circuit 34 comprising antenna matching components, such as impedance matching components, such as a balun, etc. The antenna feed 16 is typically provided at the printed circuit board 20.

The at least part 9 of the antenna 6 being adjacent the battery 10 may be 10% of the length of the antenna, such as at least 10% of the length of the antenna, such as 15%, such as at least 15%, such as at least 25% of the length of the antenna is adjacent the battery.

The antenna shown in FIG. 1 is a quarter wavelength antenna having a length of one quarter of the RF wavelength to be emitted and received. It is envisaged that also other antennas could be used, including full wavelength loop antennas, half wavelength antennas, dipole antennas, etc.

The filter circuit is configured to connect the battery to the power management circuit at frequencies below 300 kHz. Hereby, the battery is configured to supply power to the power management circuit at frequencies below 300 kHz, such as below 3 kHz, such as at DC currents.

The filter circuit additionally controls a coupling between the battery and a ground potential at RF frequencies, such as at frequencies above 3 MHz, such as at frequencies between 3 MHz and 6 GHz, such as between 3 MHz and 60 GHz, such as between 3 MHz and 300 GHz. The coupling may enable the battery to re-emit electromagnetic radiation.

Figure 2:
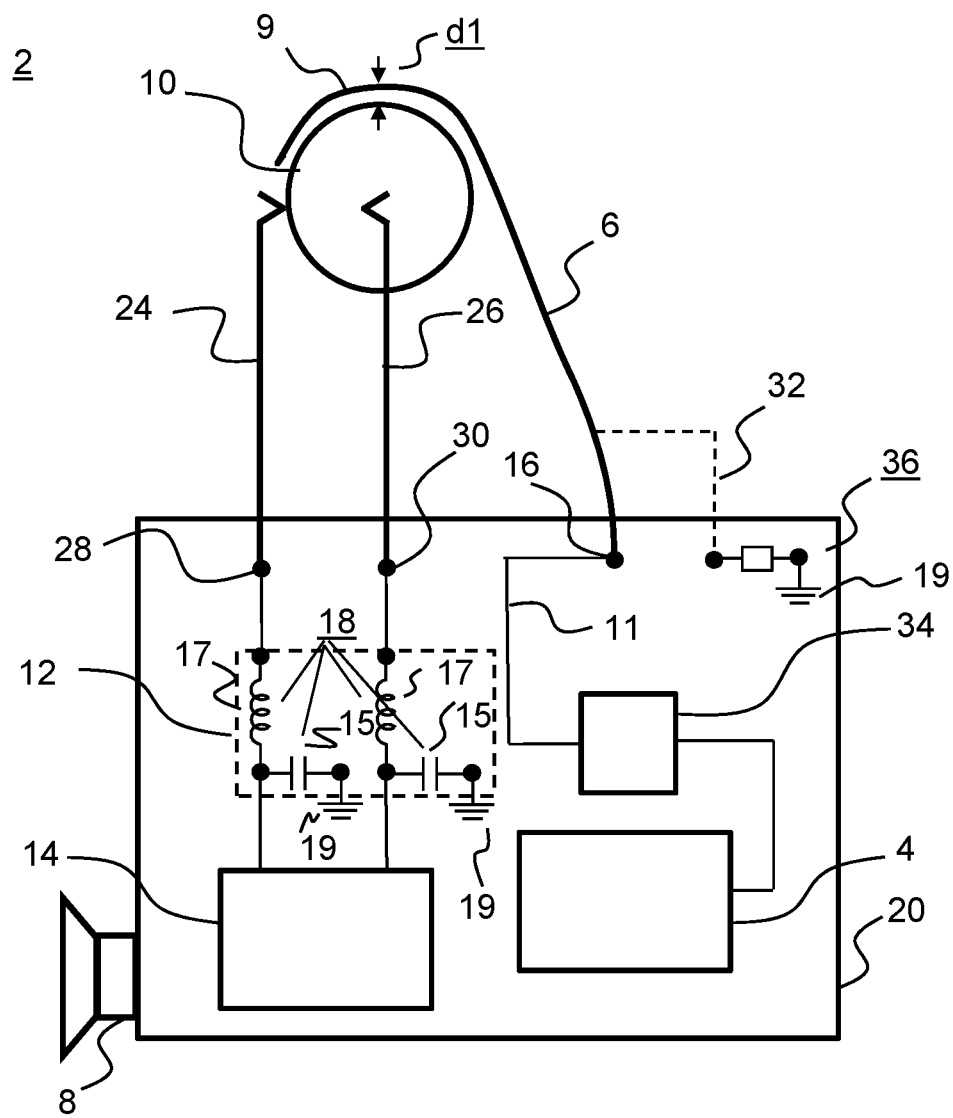
FIG. 2 shows a schematically another exemplary hearing instrument according to the present disclosure in which at least a part of an antenna is provided adjacent the battery.

FIG. 2 shows schematically another exemplary hearing instrument 2 according to a first aspect of the present disclosure. The same reference numerals as used with FIG. 1 are used for same or similar features in FIG. 2. The hearing instrument 2 comprises wireless communication unit 4 for wireless communication interconnected with antenna 6 for emission and reception of an electromagnetic field having an RF wavelength. The filter circuit 12 comprises a number of tuning components 18, including capacitors 15 and inductors 17. The tuning components 18 are arranged so that an inductor 17 interconnects battery terminal 28 and power management circuit 14. A capacitor 15 connects the inductor 17 to ground 19. The tuning components 18 are further arranged so that an inductor 17 interconnects battery terminal 30 and power management circuit 14. A capacitor 15 connects the inductor 17 to ground 19. This may be implemented in different ways and one or more inductors 17 may interconnect battery terminals 28, 30 and power management circuit 14.

Hereby, the battery terminals 28, 30 are connected to the power management circuit 14 at low frequencies for which the capacitive reactance magnitude of capacitor 15 is comparatively high and the inductive reactance magnitude of inductor 17 is comparatively low, whereas the battery terminals 28, 30 are de-coupled from ground 19 through inductor 17 and capacitor 15 when the frequency is high at which frequency the capacitive reactance magnitude of capacitor 15 is comparatively lower, and the inductive reactance magnitude of inductor 17 is comparatively higher.

The filter circuit 12 is an LC circuit, and the total impedance of the filter circuit is given by the combination of the inductive and capacitive impedances according to circuit theory. Thus, by selecting or tuning inductive and capacitive reactance magnitude of the tuning components 15, 17 of the filter circuit 12, the filter circuit may be configured to supply power to the power management circuit at frequencies below 300 kHz, such as below 3 kHz, such as at DC currents.

The selected or tuned parameter values of the tuning components 15, 17 of the filter circuit 12, may additionally be configured to control a coupling between the battery and a ground potential at RF frequencies, such as at frequencies above 3 MHz, such as at frequencies between 3 MHz and 6 GHz, such as between 3 MHz and 60 GHz, such as between 3 MHz and 300 GHz. The coupling may enable the battery to re-emit electromagnetic radiation.

The antenna 6 may be a monopole antenna and have a single feed at the feed 16, the antenna 6 may be an inverted F antenna, IFA, and have an antenna tuning stub 32, so that the antenna 6 has an additional connection to ground 19 trough antenna tuning components 36.

Figure 3:
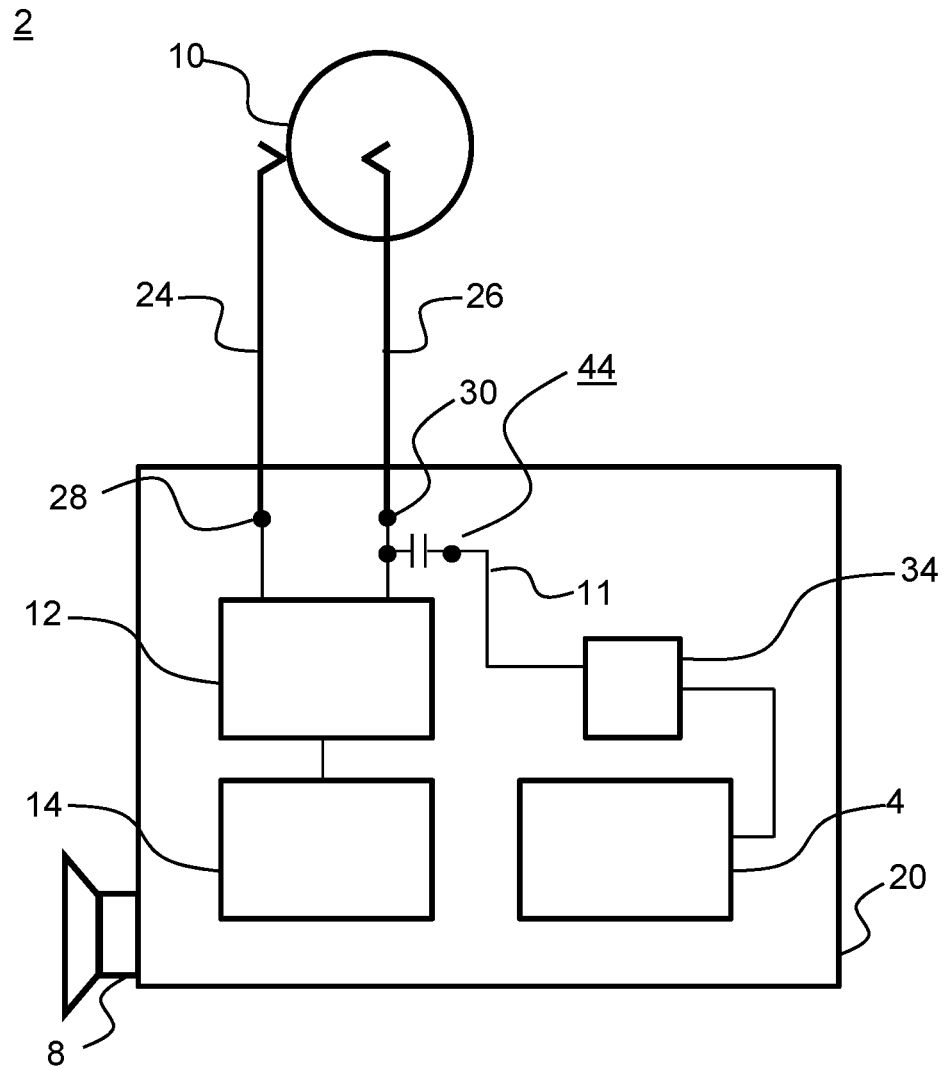
FIG. 3 shows a hearing instrument according to the present disclosure in which the battery is fed from the wireless communication unit.

FIG. 3 shows a hearing instrument 2 according to another aspect of the present disclosure, and comprises a wireless communication unit 4 for wireless communication, a speaker 8 interconnected with the wireless communication unit 4 and being configured to provide an output audio signal, a battery 10 configured to supply power to the hearing instrument 2, such as to electronics of the hearing instrument 2. The hearing instrument 2 further comprises a filter circuit 12 interconnecting the battery 10 and a power management circuit 14 of the hearing instrument 2. The wireless communication unit 2 is interconnected with the battery 10. The battery is configured for emission and reception of an electromagnetic field having an RF wavelength. The battery may also re-emit a received electromagnetic field. The wireless communication unit 2, such as a radio or transceiver, may be connected to the battery 10 via battery terminal 30 and transmission line 11. A DC block 44, such as capacitor 44, is provided in series with the transmission line 11, to prevent flow of DC current towards the wireless communication unit.

The wireless communication unit 4, the filter circuit 12 and the power management circuit 14 are typically provided at a printed circuit board 20. Most often, the components and circuits are provided on a same printed circuit board 20, however, different circuits or units may also be provided on different, but interconnected printed circuit boards.

The battery 10 has a positive and a negative battery pole, and the hearing instrument 2 comprises a first battery terminal 28 and a second battery terminal 30 for connecting the battery 10, such as the positive and negative battery poles, to the printed circuit board 20 of the hearing instrument 2. The hearing instrument 2 further comprises a coupling element 24, 26, the coupling element 24, 26 interconnecting the battery 10 with the filter circuit 12 via the battery terminals 28, 30. The coupling element 24, 26 may thus comprise a first battery contact 24 and a second battery contact 26 for connecting the positive and the negative poles of the battery to first and second battery terminals 28, 30. The battery terminals 28, 30 are typically provided at the printed circuit board 20. The battery 10 is connected to the filter circuit 12 via the battery terminals 28, 30.

The filter circuit is configured to connect the battery to the power management circuit at frequencies below 300 kHz. Hereby, the battery is configured to supply power to the power management circuit at frequencies below 300 kHz, such as below 3 kHz, such as at DC currents.

The filter circuit additionally controls a coupling between the battery and a ground potential at RF frequencies, such as at frequencies above 3 MHz, such as at frequencies between 3 MHz and 6 GHz, such as between 3 MHz and 60 GHz, such as between 3 MHz and 300 GHz. The coupling may enable the battery to re-emit received electromagnetic radiation.

Figure 4:
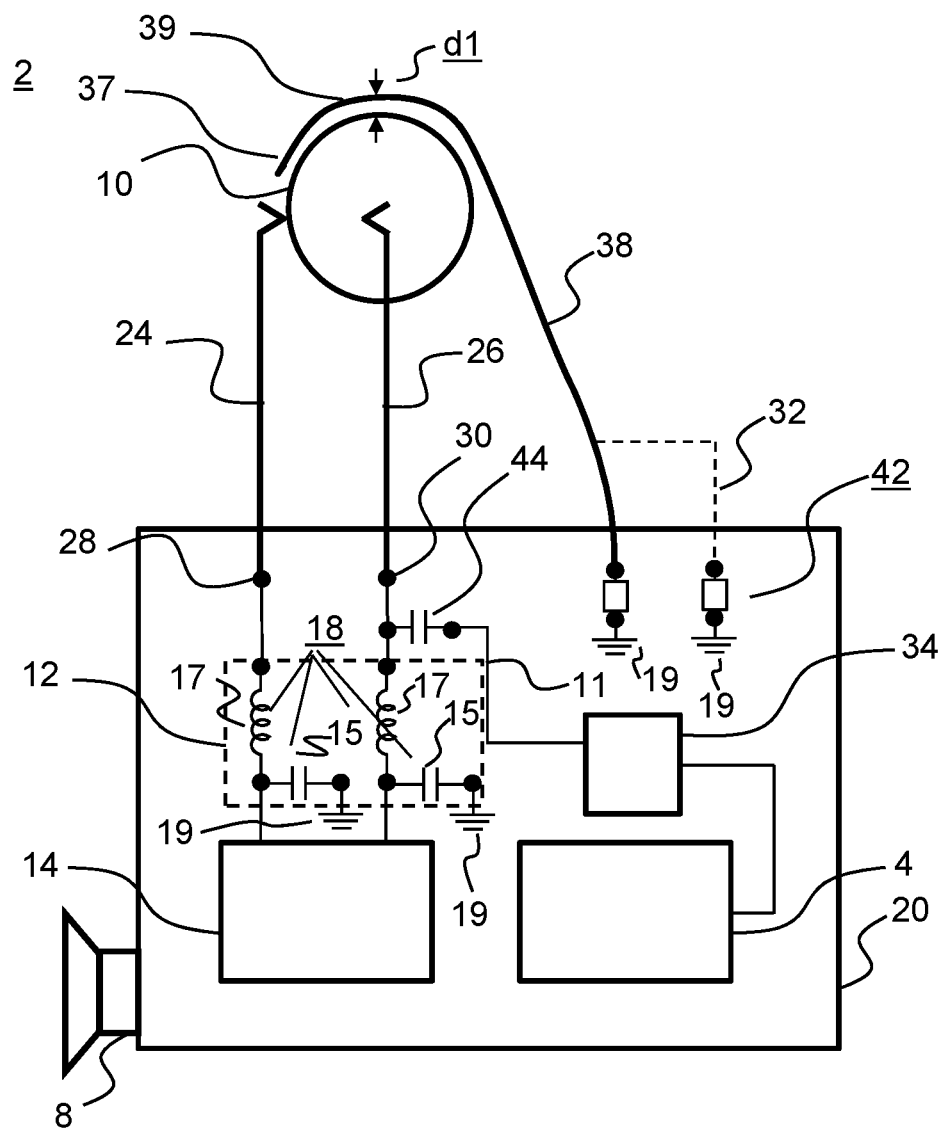
FIG. 4 shows another exemplary hearing instrument according to the present disclosure in which the battery is fed from the wireless communication unit, and having a parasitic antenna element.

FIG. 4 shows schematically another exemplary hearing instrument 2 according to a third aspect of the present disclosure. The same reference numerals as used with FIG. 3 are used for same or similar features in FIG. 4.

FIG. 4 shows a hearing instrument 2 according to another aspect of the present disclosure, and comprises a wireless communication unit 4 for wireless communication. The hearing instrument 2 further comprises a battery 10 and a filter circuit 12 interconnecting the battery 10 and a power management circuit 14 of the hearing instrument 2. The wireless communication unit 2 is interconnected with the battery 10. The battery as connected to the filter circuit is configured for emission and reception of an electromagnetic field having an RF wavelength. The battery may also re-emit a received electromagnetic field.

The filter circuit 12 comprises a number of tuning components 18, including capacitors 15 and inductors 17. The tuning components 18 are arranged so that an inductor 17 interconnects battery terminal 28 and power management circuit 14. A capacitor 15 connects the inductor 17, and thus the battery terminal 28, to ground 19. The tuning components 18 are further arranged so that an inductor 17 interconnects battery terminal 30 and power management circuit 14. A capacitor 15 connects the inductor 17 to ground 19. This may be implemented in different ways and one or more inductors 17 may interconnect battery terminals 28, 30 and power management circuit 14.

Hereby, the battery terminals 28, 30 are connected to the power management circuit 14 at low frequencies for which the capacitive reactance magnitude of capacitor 15 is comparatively high and the inductive reactance magnitude of inductor 17 is comparatively low, whereas the battery terminals 28, 30 are de-coupled from ground 19 through inductor 17 and capacitor 15 when the frequency is high at which frequency the capacitive reactance magnitude of capacitor 15 is comparatively lower, and the inductive reactance magnitude of inductor 17 is comparatively higher.

The filter circuit 12 is an LC circuit, and the total impedance of the filter circuit is given by the combination of the inductive and capacitive impedances according to circuit theory. Thus, by selecting or tuning inductive and capacitive reactance magnitude of the tuning components 15, 17 of the filter circuit 12, the filter circuit may be configured to supply power to the power management circuit at frequencies below 300 kHz, such as below 3 kHz, such as at DC currents.

The selected or tuned parameter values of the tuning components 15, 17 of the filter circuit 12, may additionally be configured to control a coupling between the battery and a ground potential at RF frequencies, such as at frequencies above 3 MHz, such as at frequencies between 3 MHz and 6 GHz, such as between 3 MHz and 60 GHz, such as between 3 MHz and 300 GHz. The coupling may enable the battery to re-emit electromagnetic radiation.

It is seen that the hearing instrument 2 comprises a parasitic antenna element 38. The parasitic antenna element 38 has a free end 37 and at least a part of the parasitic antenna element forms at least partly a loop around the battery. The at least part 39 of the parasitic antenna element 38 is arranged adjacent the battery. The at least part 39 of the parasitic antenna element 38 is arranged with a distance d1 between the at least part 39 of the parasitic antenna element 38 and the battery 10 being below ¹⁄₄₀ of the RF wavelength. The at least part 39 of the parasitic antenna element 38 being arranged adjacent the battery, is a free end 37 of the parasitic antenna element 38.

The parasitic antenna element 38 may be a quarter RF wavelength parasitic antenna element having a free end, the parasitic antenna element 38 may be a loop formed parasitic antenna element and may have a length of a full RF wavelength, etc. The parasitic antenna element 38 have a single connection to ground 19, or the parasitic antenna element may have an antenna tuning stub 32, so that the parasitic antenna element 28 has an additional connection to ground 19 trough parasitic antenna element tuning components 42.

The at least part 39 of the parasitic antenna element 38 being adjacent the battery 10 may be 10% of the length of the parasitic antenna element, such as at least 10% of the length of the parasitic antenna element, such as 15%, such as at least 15%, such as at least 25% of the length of the parasitic antenna element is adjacent the battery.

Figure 5:
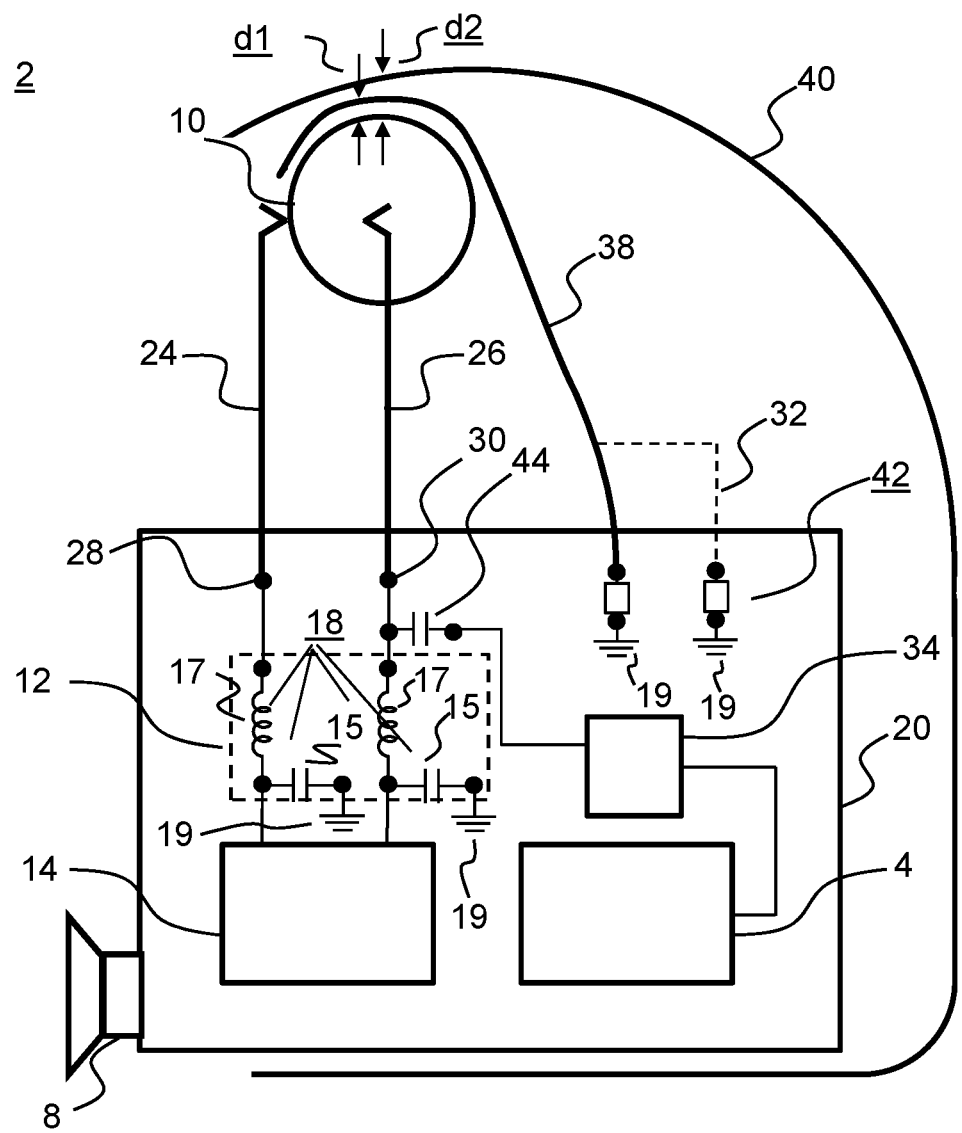
FIG. 5 shows another exemplary hearing instrument according to the present disclosure in which the battery is fed from the wireless communication unit, and having a further parasitic antenna element.

FIG. 5 shows schematically another exemplary hearing instrument 2 according to the third aspect of the present disclosure. The same reference numerals as used with FIGS. 3 and 4 are used for same or similar features in FIG. 5.

FIG. 5 shows a hearing instrument 2 and comprises a wireless communication unit 4 for wireless communication. The hearing instrument 2 further comprises a battery 10 and a filter circuit 12 interconnecting the battery 10 and a power management circuit 14 of the hearing instrument 2. The wireless communication unit 2 is interconnected with the battery 10. The battery as connected to the filter circuit is configured for emission and reception of an electromagnetic field having an RF wavelength. The battery may also re-emit a received electromagnetic field.

The hearing instrument 2 comprises a first parasitic antenna element 38 and a second parasitic antenna element 40. In FIG. 5, it is seen that the second parasitic antenna elements is a floating parasitic antenna element. The floating parasitic antenna element has a length of half the RF wavelength.

The at least part 39 of the parasitic antenna elements 38, 40 being adjacent the battery 10 may be 10% of the length of the parasitic antenna elements, such as at least 10% of the length of the parasitic antenna element, such as 15%, such as at least 15%, such as at least 25% of the length of the parasitic antenna element is adjacent the battery. A distance d1 between the at least part of the first parasitic antenna element 38 and the battery 10 may be below ¹⁄₄₀ of the wavelength and a distance d2 between the at least part of the second parasitic antenna element 40 and the battery 10 may be below ¹⁄₄₀ of the wavelength, such as the RF wavelength.

Figure 6:
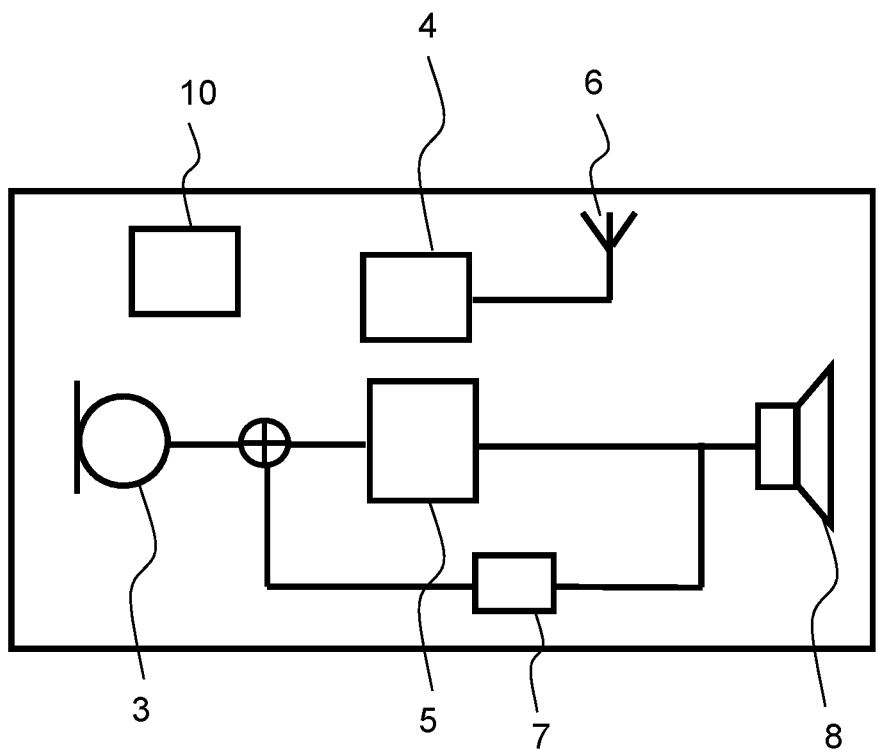
FIG. 6 shows a block-diagram of an exemplary hearing instrument according to the present disclosure.

A block-diagram of a typical (prior-art) hearing instrument 2 is shown in FIG. 6. The hearing instrument 2 comprises a first transducer, i.e. microphone 3, for receiving incoming sound and converting it into an audio signal, i.e. a first audio signal. The first audio signal is provided to a signal processor 5 for processing the first audio signal into a second audio signal. In some embodiments, the signal processor is configured for processing the first audio signal into a second audio signal compensating a hearing loss of a user of the hearing instrument. A receiver or speaker 8 is connected to an output of the signal processor 5 for converting the second audio signal into an output sound signal, such as for example a signal modified to compensate for a user's hearing impairment, such as for example a noise reduced signal, etc., and provides the output sound to the speaker 8. Typically, the receiver 8 comprises a transducer, and the receiver 8 may be referred to as speaker 8.

Thus, the hearing instrument signal processor 5 comprises elements such as amplifiers, compressors and noise reduction systems etc. The hearing instrument or hearing aid may further have a filter function 7, such as compensation filter for optimizing the output signal. The hearing aid may furthermore have a wireless communication unit 4 for wireless data communication interconnected with an antenna 6 for emission and reception of an electromagnetic field. The wireless communication unit 4, such as a radio or a transceiver, connect to the hearing instrument signal processor 5 and the antenna 6, for communicating with external devices, or with another hearing instrument, such as another hearing instrument, located at another ear, such as for example in a binaural hearing instrument system. The hearing instrument 2 further comprises a power source 10, such as a battery 10.

The hearing instrument may be a behind-the ear hearing instrument, and may be provided as a behind-the-ear module, the hearing instrument may be an in-the-ear module and may be provided as an in-the-ear module. Alternatively, parts of the hearing instrument may be provided in a behind-the-ear module, while other parts, such as the receiver, may be provided in an in-the-ear module.

Although features have been shown and described, it will be understood that they are not intended to limit the claimed invention, and it will be made obvious to those skilled in the art that various changes and modifications may be made without departing from the spirit and scope of the claimed invention. The specification and drawings are, accordingly to be regarded in an illustrative rather than restrictive sense. The claimed invention is intended to cover all alternatives, modifications, and equivalents.

The invention claimed is:

1. A hearing instrument comprising:
   a wireless communication unit for wireless communication;
   a battery configured to supply power for the hearing instrument;
   a power management circuit; and
   a filter circuit coupled to the battery and the power management circuit;
   wherein the wireless communication unit is coupled with the battery, the battery being configured for electromagnetic field emission and electromagnetic field reception, wherein an electromagnetic field emitted or received by the battery has a wavelength;
   wherein at least a part of the battery between positive pole and negative pole of the battery is configured to operate as a part of a battery antenna; and
   wherein the filter circuit is coupled to a first battery terminal and a second battery terminal via respective conductive elements that are not directly connected to ground.

2. The hearing instrument of claim 1, wherein one of the conductive elements is configured to feed the battery antenna.

3. The hearing instrument of claim 1, wherein an entirety of the battery including the positive and negative poles of the battery is configured to operate as the battery antenna.

4. The hearing instrument of claim 1, wherein the filter circuit is configured to prevent the power management circuit from receiving battery power from the battery at frequencies above a threshold.

5. The hearing instrument of claim 1, wherein the filter circuit is configured to allow battery power from the battery to be delivered to the power management circuit at frequencies below a threshold.

6. The hearing instrument of claim 1, wherein the battery is configured to operate as the battery antenna at a frequency controlled by the filter circuit.

7. The hearing instrument according to claim 1, wherein the filter circuit is configured to de-couple the battery and the power management circuit at frequencies above 3 MHz.

8. The hearing instrument according to claim 1, wherein the filter circuit is configured to connect the battery to the power management circuit at frequencies below 300 kHz.

9. The hearing instrument according to claim 1, wherein the battery is configured to supply power to the power management circuit at frequencies below 300 kHz.

10. The hearing instrument according to claim 1, wherein the filter circuit is configured to control a coupling between the battery and the ground at frequencies above 3 MHz.

11. The hearing instrument according to claim 1, further comprising tuning component(s) configured to determine an impedance of the filter circuit.

12. The hearing instrument according to claim 1, further comprising tuning component(s) configured to tune an impedance of the filter circuit with respect to the wavelength.

13. The hearing instrument according to claim 11, wherein the tuning component(s) comprises an inductor, a capacitor, a transmission line, or any combination thereof.

14. The hearing instrument according to claim 13, wherein the transmission line comprises a quarter wavelength transmission line.

15. The hearing instrument according to claim 11, wherein the tuning component(s) has an inductive reactance that is between ½ nH and 50 nH.

16. The hearing instrument according to claim 11, wherein the tuning component(s) has a capacitive reactance that is between 0.1 pF and 100 pF.

17. The hearing instrument according to claim 11, wherein the tuning component(s) has an RF impedance magnitude that is at least 100 Ohm.

18. The hearing instrument according to claim 1, wherein the first and second battery terminals comprise first and second battery contacts configured to contact the positive and negative poles of the battery, respectively.

19. The hearing instrument according to claim 1, further comprising one or more parasitic antenna elements, wherein at least one of the one or more parasitic antenna elements has a free end.

20. The hearing instrument according to claim 19, wherein a distance between at least a part of the one or more parasitic antenna elements and the battery is below 1/40 of the wavelength.

21. The hearing instrument according to claim 20, wherein the at least a part of the one or more parasitic antenna elements is a free end of the one or more parasitic antenna elements.

22. The hearing instrument according to claim 20, wherein the at least a part of the one or more parasitic antenna elements is a center part of the one or more parasitic antenna elements.

23. The hearing instrument according to claim 19, wherein at least one of the one or more parasitic antenna elements is a floating parasitic antenna element.

24. The hearing instrument according to claim 19, further comprising tuning component(s) configured to improve a coupling between the battery and the one or more parasitic antenna elements at a certain frequency.

25. The hearing instrument according to claim 1, further comprising a parasitic antenna element, wherein at least a part of the parasitic antenna element forms at least a part of a loop around the battery.

26. A method of operating a hearing instrument, the hearing instrument comprising a wireless communication unit for wireless communication, a battery configured to supply power for the hearing instrument, a power management circuit, and a filter circuit coupled to the battery and the power management circuit, wherein the filter circuit is coupled to a first battery terminal and a second battery terminal via respective conductive elements that are not directly connected to ground, the method comprising:
   feeding the battery; and
   using the battery for electromagnetic field emission and electromagnetic field reception, wherein the act of using the battery for electromagnetic field emission and electromagnetic field reception comprises using at least a part of the battery that is between positive pole and negative pole of the battery.

27. A hearing instrument comprising:
   a wireless communication unit for wireless communication;
   a battery configured to supply power for the hearing instrument;
   a power management circuit; and
   a filter circuit coupled to the battery and the power management circuit;

wherein the wireless communication unit is coupled with the battery, the battery being configured for electromagnetic field emission and electromagnetic field reception, wherein an electromagnetic field emitted or received by the battery has a wavelength; and wherein the filter circuit is configured to provide battery-feed signals to the battery via multiple transmission lines.

\* \* \* \* \*